United States Patent
Wang et al.

(10) Patent No.: US 12,398,041 B2
(45) Date of Patent: Aug. 26, 2025

(54) METHOD AND DEVICE FOR PREPARING GRAPHENE AND HYDROGEN GAS BY CONVERTING WASTE PLASTICS WITH JOULE HEAT

(71) Applicant: TONGJI UNIVERSITY, Shanghai (CN)

(72) Inventors: Ying Wang, Shanghai (CN); Yilong Yan, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 662 days.

(21) Appl. No.: 17/824,031

(22) Filed: May 25, 2022

(65) Prior Publication Data

US 2023/0024513 A1    Jan. 26, 2023

(30) Foreign Application Priority Data

Jul. 22, 2021  (CN) .......................... 202110827848.1

(51) Int. Cl.
| | |
|---|---|
| *C01B 32/184* | (2017.01) |
| *B01J 6/00* | (2006.01) |
| *C01B 3/02* | (2006.01) |
| *C10J 3/82* | (2006.01) |

(52) U.S. Cl.
CPC ............. *C01B 32/184* (2017.08); *B01J 6/008* (2013.01); *C01B 3/02* (2013.01); *C10J 3/82* (2013.01); *C10J 2300/0946* (2013.01); *C10J 2300/1618* (2013.01)

(58) Field of Classification Search
CPC  C01B 32/184; C01B 3/02; B01J 6/008; B01J 19/087; C10J 3/82; C10J 2300/0946; C10J 2300/1618; Y02P 20/129; Y02W 30/62; C08J 11/10; C08J 2323/06; C08J 2323/12; C08J 2325/06; C08J 2367/02
See application file for complete search history.

(56) References Cited

FOREIGN PATENT DOCUMENTS

CN          112479191 A  *  3/2021

* cited by examiner

*Primary Examiner* — Anthony J Zimmer
*Assistant Examiner* — Syed T Iqbal
(74) *Attorney, Agent, or Firm* — Troutman Pepper Locke LLP; Tim Tingkang Xia, Esq.

(57) ABSTRACT

A method and a device for preparing graphene and hydrogen gas by converting waste plastics with Joule heat are provided according to the present application. The method uses the Joule heat generated when a strong current passes through the mixed plastic material mixed with conductive additive, as the reaction driving energy. By Joule heating, carbon-carbon bonds and carbon-hydrogen bonds are broken, amorphous carbon is converted into $sp^2$ hybridized high-purity graphene, and hydrogen atoms are converted into hydrogen gas. The reaction device used by the method is mainly composed of three parts: an airtight reaction chamber, a gas collecting system and a power control system.

4 Claims, 1 Drawing Sheet

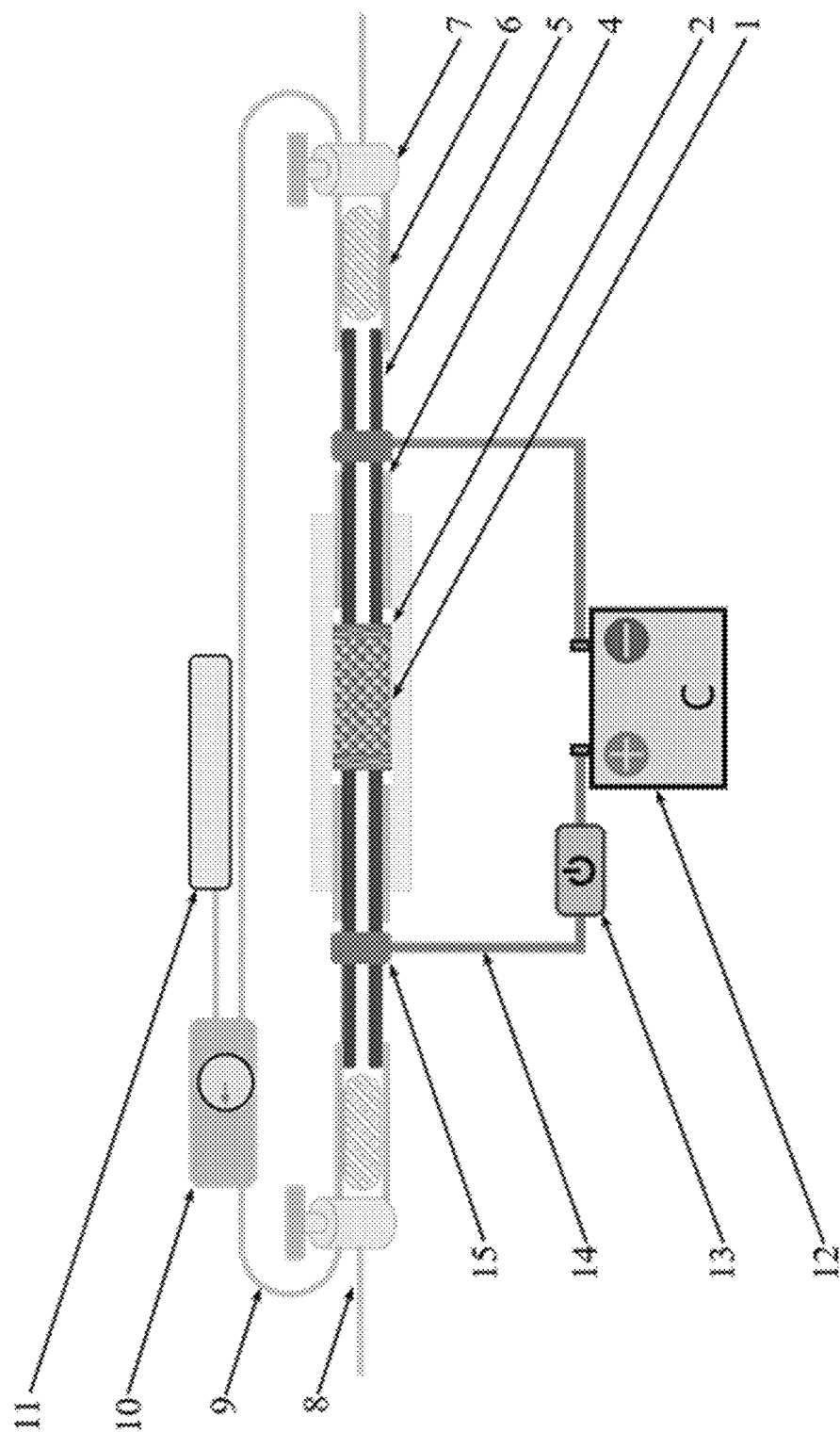

METHOD AND DEVICE FOR PREPARING GRAPHENE AND HYDROGEN GAS BY CONVERTING WASTE PLASTICS WITH JOULE HEAT

CROSS-REFERENCE TO RELATED PATENT APPLICATION

This non-provisional application claims priority to and the benefit of, pursuant to 35 U.S.C. § 119(a), patent application Serial No. CN202110827848.1 filed in China on Jul. 22, 2021. The disclosure of the above application is incorporated herein in its entirety by reference.

FIELD

The present application relates to a method and a device for preparing graphene and hydrogen gas by converting waste plastics with Joule heat, and it belongs to the technical field of treatment and resource utilization of solid waste.

BACKGROUND

The global annual production of plastics is about 380 million tons, and it is increasing steadily at a rate of about 8.4%. Most of the plastic products are discarded or landfilled after only one use, and only about 18% of plastic waste is recycled. Improperly handled plastic waste causes a series of ecological and environmental problems. For example, microplastics and nanoplastics can be ingested by various organisms, and nanoplastics can even accumulate in plants. At present, the widely adopted plastic waste recycling technologies include mechanical recycling, cracking (pyrolysis) and incineration. Mechanical recycling is simple in process and widely used, but cannot handle temperature-sensitive plastics, composites, thermosets and so on. Mechanical recycling also requires complex pre-sorting process. At present, only two types of plastics, poly (ethylene terephthalate) (PET) and polyethylene, are recovered and recycled with mechanical processes. The plastic cracking technology is complex in process, energy-consuming and has poor selectivity for desirable products. Therefore, the purification of products of cracking is difficult and the economic value is low, and the development of waste plastic cracking technology is slow. Incineration does not require complicated pretreatment process and can generate electricity. However, monomers derived from fossil fuels are only partially recovered in the form of heat energy and lose their recycling value in this process. This technology has a low resource conversion rate, which accelerates the consumption of fossil fuel resources to a certain extent and increases the carbon dioxide emissions. In summary, the management of plastic wastes suffers from low benefits, high costs, and secondary pollution, leading to limited practical applications. Therefore, the development of efficient approaches to valorize plastic wastes into value-added products is indispensable.

The One-step process substantially simplifies approaches to the catalytic deconstruction of plastic waste which rapidly transforms waste plastic into hydrogen fuel and valuable carbon materials (carbon nanotubes or graphene). Compared with conventional plastic waste recycling technology, this method can process multiple types of plastic mixtures or composite plastics (such as LDPE, HDPE, PP, PS, PET and the like) at the same time. This method also simplifies the pre-sorting process, with fast reaction rate and low energy consumption. Solid-phase and gas-phase products thereof have high economic value, are easy to separate and do not need purification process. Therefore, this method may be used in large scale and possibly solve the dilemma of low plastic waste recycling rate and relatively lagging conversion technology.

SUMMARY

An object of the present application is to solve the problems encountered by the current waste plastic recycling technologies, such as time- and energy-consuming sorting and purification requirements, low economic feasibility, high greenhouse gas emissions, low selectivity for desirable products, and performance deterioration of target products; and to provide a method and a device for preparing graphene and hydrogen gas by converting waste plastics with Joule heat.

The following technical solutions are provided according to the present application. A device for preparing graphene and hydrogen gas by converting waste plastics with Joule heat includes an airtight reaction chamber, a gas collecting system and a power control system.

The airtight reaction chamber includes a central quartz chamber configured to hold a conductive mixture of waste plastics, two refractory, gas permeable and conductive auxiliary electrodes arranged on the left and right sides of the conductive mixture, and two hollow electrodes inserted from the left and right sides of the conductive mixture.

A gas inlet pipeline for transporting inert protective gas into the airtight reaction chamber is provided outside the airtight reaction chamber.

The gas collecting system includes a filter cold trap, a pressure-resistant gas collecting pipeline, a gas collecting unit, and a gas pressure control unit arranged on the pressure-resistant gas collecting pipeline and connected to the gas collecting unit. The gas inlet pipeline of the airtight reaction chamber, the filter cold trap, and the pressure-resistant gas collecting pipeline of the gas collecting system are connected by a three-way valve. The hollow electrodes, the filter cold trap, the three-way valve, and the pressure-resistant gas collecting pipeline together form an airtight passage.

The filter cold trap is configured to filter off solid particles and waxy by-products, and is connected with an outer part of the hollow electrode.

The power control system is configured to regulate an output voltage, an on-off state, an on-off time and an on-off mode of the circuit according to the resistance of the conductive mixture in the airtight reaction chamber.

Further, each of the two hollow electrodes is closely attached to the corresponding refractory, gas permeable and conductive auxiliary electrode, a refractory silicone seal ring is provided between each of the hollow electrodes and the corresponding refractory, gas permeable and conductive auxiliary electrode, and has a distance of 10-20 mm from the corresponding refractory, gas permeable and conductive auxiliary electrode, and each silicone sealing ring forms a gas barrier structure together with an outer wall of the central quartz chamber and the corresponding hollow electrode, ensuring that the gas in the central quartz chamber can only enter and exit from a passage inside each of the two hollow electrodes.

Further, each of the two hollow electrodes is made of a conductive refractory material such as graphite or copper.

Further, each refractory, gas permeable and conductive auxiliary electrode is prepared by weaving and compacting copper foam or fine copper wires.

Further, the power control system includes two copper connection webbings tightly wrapped on the left and right sides of the two hollow electrodes, two high-voltage cables connected with the two copper connection webbings, a circuit control unit, and a high-voltage capacitor bank with a capacity of 50 mF-300 mF. The two high-voltage cables are respectively connected to the anode and cathode of the high-voltage capacitor bank, and the circuit control unit is arranged on one of the high-voltage cables connected to the high-voltage capacitor bank.

A method for preparing graphene and hydrogen gas by converting waste plastics with Joule heat by means of the above-mentioned device is further provided according to the present application, which includes the following steps: S1: pretreating the plastic waste to obtain plastic powder with a particle size of 0.1-2.0 mm, well-mixing the plastic powder with 5-20 wt % of carbon black as a conductive additive to form a conductive mixture, controlling a resistance of the conductive mixture to 0.1-100Ω, and filling the conductive mixture into the central quartz chamber;

S2: opening the gas inlet pipeline and closing the gas collecting pipeline by turning the three-way valve before reaction, introducing inert protective gas argon or nitrogen into the reaction chamber, and then collecting the gas generated during the reaction by closing the gas inlet pipeline and opening the gas collecting pipeline;

S3: charging the high-voltage capacitor bank to 50-1000V by the power control system according to the mass and a resistance of the conductive mixture during the reaction, and controlling the on-off state, the on-off time of 50-1000 ms, and the frequency of on-off switching of the high-voltage cable at the positive pole of the high-voltage capacitor bank by the circuit control unit.

Further, in step S2, the gas pressure of the airtight passage is controlled by the gas pressure control unit to be within the range of 0-0.5 Mpa, and when the pressure is higher than a set value, the gas enters the gas collecting unit for storage through an exhaust hole of the gas pressure control unit.

Further, the plastic waste includes LDPE, HDPE, PP, PS, and PET.

The present application has the following advantages.

1. The method and device provided by the present application use the Joule heat generated when a strong current passes through the conductive mixed plastic particles as the reaction driving energy. By Joule heating, carbon-carbon bonds and carbon-hydrogen bonds are broken, amorphous carbon is converted into $sp^2$ hybridized high-purity graphene, and hydrogen atoms are converted into hydrogen gas. The reaction device used by the method is mainly composed of three parts, which are the airtight reaction chamber, the gas collecting system and the power control system. During the reaction, the power control system passes a high-voltage direct current through the conductive mixed plastic particles sealed in the airtight reaction chamber in a very short time, and the resistance of the mixed material itself generates a large amount of Joule heat under the action of the current, so that the temperature of the material is rapidly raised from room temperature to above 3000K. The extremely fast annealing process effectively inhibits the stacking of graphene, and the excess energy is dissipated in the form of strong light, which can effectively avoid the problems of short service life of the device and high safety hazards caused by overheating of the reaction chamber. The gaseous products generated by the reaction can be simply filtered to remove a small amount of waxy products to obtain high-purity hydrogen gas, and the energy consumption per kilogram of mixed plastic waste is only 2-4 kW·h. The conversion rate of carbon in the mixed plastic material to high-quality graphene is 25-50%, and the conversion rate of hydrogen to hydrogen gas exceeds 90%. The solid phase product and the gaseous product do not need further purification treatment, the graphene can be directly dispersed into the solution, and the hydrogen can be collected and stored for use as green energy.

2. The present application realizes high-value conversion of mixed waste plastics. Compared with the existing recycling methods such as mechanical recycling, cracking and incineration, this method simplifies the sorting process of plastics and is suitable for more types of plastics. The conversion process is fast and efficient with low energy consumption, and has lower safety hazards and environmental risks. The products thereof have high economic value and are sustainable energy. On the one hand, it improves the conversion efficiency of resources and energy, and on the other hand, it significantly improves the economic benefits of plastic recycling technology, laying a solid foundation for the development of the plastic high-value recycling industry, and alleviating a series of ecological and environmental problems caused by plastic waste.

BRIEF DESCRIPTION OF THE DRAWINGS

The present application will be described in more detail below on the basis of embodiments and with reference to the accompanying drawings.

FIG. 1 is a schematic view of a device according to the present application.

DETAILED DESCRIPTION OF THE DISCLOSURE

Technical solutions in the embodiments of the present application are clearly and completely described hereinafter in conjunction with the drawings in the embodiments of the present application. Apparently, the embodiments described in the following are only some embodiments of the present application, rather than all embodiments. Based on the embodiments in the present application, all of other embodiments, made by the person of ordinary skill in the art without any creative efforts, fall into the scope of protection of the present application.

First Embodiment

As shown in FIG. 1, a device for preparing graphene and hydrogen gas by converting waste plastics with Joule heat is provided, which includes an airtight reaction chamber, a gas collecting system and a power control system.

The airtight reaction chamber includes a central quartz chamber 1 configured to hold a conductive mixture of waste plastics, two refractory, gas permeable and conductive auxiliary electrodes 2 arranged on the left and right sides of the conductive mixture, and two hollow electrodes 5 inserted from the left and right sides of the conductive mixture.

A gas inlet pipeline 8 for transporting inert protective gas into the airtight reaction chamber is provided outside the airtight reaction chamber.

The gas collecting system includes a filter cold trap 6, a pressure-resistant gas collecting pipeline 9, a gas collecting unit 11, and a gas pressure control unit 10 arranged on the pressure-resistant gas collecting pipeline 9 and connected to the gas collecting unit 11. The gas inlet pipeline 8 of the airtight reaction chamber, the filter cold trap 6, and the pressure-resistant gas collecting pipeline 9 of the gas collecting system are connected by a three-way valve 7. The hollow electrodes 5, the filter cold trap 6, the three-way valve 7, and the pressure-resistant gas collecting pipeline 9 together form an airtight passage. Each of the two hollow electrodes 5 is closely attached to the corresponding refractory, gas permeable and conductive auxiliary electrode 2, a refractory silicone seal ring 4 is provided between each of the hollow electrodes 5 and the corresponding refractory, gas permeable and conductive auxiliary electrode 2, and has a distance of 10-20 mm from the corresponding refractory, gas permeable and conductive auxiliary electrode 2, and each silicone sealing ring 4 forms a gas barrier structure together with an outer wall of the central quartz chamber 1 and the corresponding hollow electrode 5, ensuring that the gas in the central quartz chamber 1 can only enter and exit from a passage inside each of the two hollow electrodes 5.

The filter cold trap 6 is configured to filter off solid particles and waxy by-products, and is connected with an outer part of the hollow electrode 5.

The power control system is configured to regulate an output voltage, an on-off state, an on-off time and an on-off mode of the circuit according to the resistance of the conductive mixture in the airtight reaction chamber.

Each of the two hollow electrodes 5 is made of a conductive refractory material such as graphite or copper. Each refractory, gas permeable and conductive auxiliary electrode 2 is prepared by weaving and compacting copper foam or fine copper wires.

The power control system includes two copper connection webbings 15 tightly wrapped on the left and right sides of the two hollow electrodes 5, two high-voltage cables 14 connected with the two copper connection webbings 15, a circuit control unit 13, and a high-voltage capacitor bank 12 with a capacity of 50 mF-300 mF. The two high-voltage cables 14 are respectively connected to the anode and cathode of the high-voltage capacitor bank 12, and the circuit control unit 13 is arranged on one of the high-voltage cables 14 connected to the high-voltage capacitor bank 12.

Second Embodiment

A method for preparing graphene and hydrogen gas by converting waste plastics with Joule heat by means of the device provided by the first embodiment is further provided according to this embodiment, which includes the following steps:

S1: pretreating plastic waste to be processed, such as LDPE, HDPE, PP, PS, and PET, to obtain plastic powder with a particle size of 0.1-2.0 mm, well-mixing the plastic powder with 5-20 wt % of carbon black added as a conductive additive to form a conductive mixture, controlling a resistance of the conductive mixture to 0.1-100Ω, and filling the conductive mixture into the central quartz chamber 1;

S2: opening the gas inlet pipeline 8 and closing the gas collecting pipeline 9 by turning the three-way valve 7 before reaction, introducing inert protective gas argon or nitrogen into the reaction chamber, and then collecting the gas generated during the reaction by closing the gas inlet pipeline 8 and opening the gas collecting pipeline 9; wherein the gas pressure of the airtight passage is controlled by the gas pressure control unit 10 to be within the range of 0-0.5 Mpa, and when the pressure is higher than a set value, the gas enters the gas collecting unit 11 for storage through an exhaust hole of the gas pressure control unit 10.

S3: charging the high-voltage capacitor bank to 50-1000V by the power control system according to the mass and a resistance of the conductive mixture during the reaction, and controlling the on-off state, the on-off time of 50-1000 ms, and the frequency of on-off switching of the high-voltage cable at the positive pole of the high-voltage capacitor bank 12 by the circuit control unit 13.

Although the present application has been described with reference to the preferred embodiments, various improvements can be made to it and the components therein can be replaced with equivalents, without departing from the scope of the present application. In particular, as long as there is no structural conflict, the various technical features mentioned in the various embodiments can be combined in any manner. The present application is not limited to the specific embodiments disclosed herein, but includes all technical solutions falling within the scope of the claims.

What is claimed is:

1. A device for preparing graphene and hydrogen gas by converting plastic waste with Joule heat, comprising an airtight reaction chamber, a gas collecting system and a power control system, wherein
   the airtight reaction chamber comprises:
   a central quartz chamber configured to hold a conductive mixture,
   two refractory, gas permeable and conductive auxiliary electrodes arranged on the left and right sides of the conductive mixture, and
   two hollow electrodes inserted from the left and right sides of the conductive mixture,
   wherein a gas inlet pipeline is arranged outside the airtight reaction chamber and configured to transport inert protective gas into the airtight reaction chamber;
   the gas collecting system comprises:
   a filter cold trap configured to filter off solid particles and a waxy by-product and connected with an outer part of the hollow electrodes,
   a pressure-resistant gas collecting pipeline,
   a gas collecting unit, and
   a gas pressure control unit arranged on the pressure-resistant gas collecting pipeline and connected to the gas collecting unit,
   wherein the gas inlet pipeline of the airtight reaction chamber, the filter cold trap, and the pressure-resistant gas collecting pipeline of the gas collecting system are connected by a three-way valve, and
   the hollow electrodes, the filter cold trap, the three-way valve, and the pressure-resistant gas collecting pipeline together form an airtight passage;
   wherein the power control system is configured to regulate an output voltage, an on-off state, an on-off time and an on-off mode of a circuit according to resistance of the conductive mixture in the airtight reaction chamber.

2. The device for preparing graphene and hydrogen gas by converting plastic waste with Joule heat according to claim 1, wherein each of the hollow electrodes is closely attached to the corresponding refractory, gas permeable and conductive auxiliary electrode,
   a refractory silicone seal ring is provided between each of the hollow electrodes and the corresponding refractory, gas permeable and conductive auxiliary electrode, and has a distance of 10-20 mm from the corresponding refractory, gas permeable and conductive auxiliary electrode, and
   a gas barrier structure is formed by each refractory silicone seal ring together with an outer wall of the central quartz chamber and the corresponding hollow electrode, to restrict gas in the central quartz chamber to entering or exiting only from a passage inside each of the hollow electrodes.

3. The device for preparing graphene and hydrogen gas by converting plastic waste with Joule heat according to claim 1, wherein the hollow electrodes are made of a conductive refractory material of graphite or copper.

4. The device for preparing graphene and hydrogen gas by converting plastic waste with Joule heat according to claim 1, wherein the refractory, gas permeable and conductive auxiliary electrodes are prepared by weaving and compacting copper foam or fine copper wires.

* * * * *